(12) United States Patent
Zappaterra et al.

(10) Patent No.: US 9,877,342 B1
(45) Date of Patent: Jan. 23, 2018

(54) METHOD AND SYSTEM FOR MANAGING A MULTI-MESSAGE EXCHANGE OVER A WIRELESS CHANNEL

(71) Applicant: Sprint Spectrum L.P., Overland Park, KS (US)

(72) Inventors: Luca Zappaterra, Arlington, VA (US); Yu Zhou, Herndon, VA (US); Muhammad A. Naim, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 88 days.

(21) Appl. No.: 15/070,794

(22) Filed: Mar. 15, 2016

(51) Int. Cl.
*H04W 74/00* (2009.01)
*H04L 27/00* (2006.01)
*H04W 74/08* (2009.01)
*H04W 72/04* (2009.01)

(52) U.S. Cl.
CPC ....... *H04W 74/008* (2013.01); *H04L 27/0006* (2013.01); *H04W 72/0406* (2013.01); *H04W 74/0816* (2013.01)

(58) Field of Classification Search
CPC .......... H04W 74/008; H04W 72/0406; H04W 74/0816; H04L 27/0006
See application file for complete search history.

(56) References Cited

U.S. PATENT DOCUMENTS

| 6,018,816 A | * | 1/2000 | Tateyama | H04L 1/0061 358/462 |
| 2005/0220145 A1 | * | 10/2005 | Nishibayashi | H04W 99/00 370/474 |
| 2010/0309869 A1 | | 12/2010 | Kim et al. | |

* cited by examiner

*Primary Examiner* — Duc C Ho

(57) ABSTRACT

When an upper layer of a device is going to initiate an exchange of two or more messages with a corresponding upper layer of another device, the initiating device will provide from its upper layer to a lower layer such as a MAC layer an indication of how many messages the devices will be exchanging. In response to that indication, the lower layer of the initiating device will then cause the lower layer of the other device to forgo checking for and confirming availability of the channel for transmission of the next message of the exchange from the other device to the initiating device. Further, the lower layer of the initiating device may also responsively forgo for and confirming availability of the channel for a subsequent message of the exchange.

20 Claims, 4 Drawing Sheets

METHOD AND SYSTEM FOR MANAGING A MULTI-MESSAGE EXCHANGE OVER A WIRELESS CHANNEL

BACKGROUND

Unless otherwise indicated herein, the description provided in this section is not itself prior art to the claims and is not admitted to be prior art by inclusion in this section.

In order for two wireless devices to engage in useful communication with each other over a wireless channel, each device could implement a protocol stack defining a sequence of logical processing layers. Under the Internet protocol suite, for instance, the protocol stack may range, top down, from an application layer to a transport layer, to a network layer, and to a data-link layer, to a physical layer. Each device may be configured to process data sequentially through the layers of such a stack, with the transmitting device processing data downward through the stack and taking specific action at each layer (e.g., adding a layer-specific header), and with the receiving device then processing data upward through the stack and taking layer-specific action at each layer (e.g., stripping the headers added by the transmitting device).

With this arrangement, the devices can communicate with each other at corresponding layers of their respective protocol stacks, with each lower layer of their protocol stacks operating on the communication along the way. In particular, a layer of one device could generate a communication to the corresponding layer of the other device, and the communication could pass down through the protocol stack of the first device, over the physical wireless channel, and up through the protocol stack of the other device to the destination corresponding layer.

For example, an application-layer program running on a first device could communicate with a corresponding application-layer program running on a second device. At the first device, for instance, the application layer could pass program data down to a transport-layer, the transport layer could add a transport-layer header (e.g., specifying originating and destination transport port numbers) and pass the result down to the network layer, the network layer could add a network-layer header (e.g., specifying originating and destination Internet Protocol (IP) addresses) and pass the result down to the data-link layer, the data-link layer could add a data-link-layer header (e.g. specifying originating and destination Media Access Control (MAC) addresses) and pass the result down to the physical layer, and the physical layer could process the result for physical transmission on the shared wireless channel and engage in physical wireless-channel transmission to the second device.

At the second device, the physical layer could then receive and process the physical wireless-channel transmission and pass the result up to the data-link layer, the data-link layer could strip the added data-link-layer header and pass the result up to the network layer, the network layer could strip the added network-layer header and pass the result up to the transport layer, and the transport layer could strip the added transport-layer header and pass the data up to the appropriate program at the application layer for handling.

As another example, the transport layer of a first device could communicate with a corresponding transport layer of a second device, in order to set up a transport layer "socket" between the two devices or to carry out other transport layer functions. At the first device, for instance, the transport layer could pass a transport-layer data message to the network layer, the network layer could add a network-layer header and pass the result to the data-link layer, the data-link layer could then add a data-link-layer header and pass the result to the physical layer, and the physical layer could process the result for transmission on the shared wireless channel, and engage in physical wireless-channel transmission to the to the second device. At the second device, the physical layer could then receive and process the physical transmission, the data-link layer could strip the added link-layer header, and the network layer could strip the added network-layer header and provide the underlying data message to the transport layer for handling.

Numerous other examples of inter-device communication using their protocol stacks are possible as well. Further, it should be understood that variations from the examples above are possible. For instance, the layers noted above could carry out operations in addition to or instead of those noted, and other layers could be implemented in addition to or instead of those noted.

When a device is going to transmit data to another device via a shared wireless channel (i.e., a channel that could be used by others as well), the transmitting device may further implement at a lower layer of its protocol stack, such as at a data-link layer (e.g., a MAC layer) or other lower layer, a process to check for and confirm availability of the channel as a condition for engaging in the transmission. To check for and confirm availability of the channel, for instance, the data-link layer could apply a carrier sense multiple access with collision avoidance (CSMA/CA) process, in which the transmitting device listens to the channel (e.g., monitors energy level on the channel) for a certain time interval to determine whether another device is transmitting on the channel, and the data-link layer concludes that the channel is available only if the transmitting device thus detects an absence of any such other transmission on the channel.

In addition, as part of the checking for and confirming availability of the channel, the data-link layer could engage in control signaling with a corresponding data-link layer of the receiving device to help ensure that the channel will be available for use by both the transmitting device and the receiving device for an expected duration for the transmission (including a duration of the transmission and a duration of an acknowledgment, and a duration of one or more associated interframe intervals). For instance, after determining that the channel is idle, the data-link layer of the transmitting device could send to the data-link layer of the receiving device a Ready-to-Send (RTS) signal that indicates the expected duration, and if the data-link layer of the receiving device receives that RTS signal, the data-link layer of the receiving device could then respond with a Clear-to-Send (CTS) signal that also indicates the expected duration or a variation of that duration. The data-link layer of the transmitting device could thus conclude that the channel will be available only if the link layer of the transmitting device receives the CTS signal from the receiving device.

This added RTS/CTS control signaling also has an added benefit of possibly helping to prevent neighboring devices from transmitting on the channel during the indicated duration, thus additionally confirming that the channel will be available for use for the intended transmission. In particular, if a neighboring device in range of the transmitting device is checking to see if the channel is available and detects the RTS signal, the neighboring device could responsively set itself to avoid use of the channel for the duration indicated in the RTS signal. Likewise, if a neighboring device in range of the receiving device is checking to see if the channel is available and detects the CTS signal, the neighboring node could responsively set itself to avoid use of the channel for the duration indicated in the CTS signal.

OVERVIEW

In the above-discussed process, when two devices communicate with each other at an upper layer of their protocol stacks, such as at their application layer or transport layer for instance, each time the upper layer of the transmitting device provides a data message (e.g., application program data, or a TCP control message) for transmission to the receiving device, the data-link layer of the transmitting device may need to go through the above-noted process of checking for and confirming availability of the shared wireless channel before then engaging in the transmission.

There are some situations, however, where two devices will engage in a relatively quick back-and-forth exchange of limited size data messages with each other at an upper layer of their protocol stacks, and where it would be inefficient to have each device go through the process of checking for and confirming availability of the channel before each transmission by the device in that exchange.

By way of example, this may happen when the devices engage transport-layer communication with each other to set up a transport layer socket between the devices. Under the Transmission Control Protocol (TCP), for instance, the devices may engage in a three-message transport-layer handshake to effectively set up multiplexed connections in both directions between the devices. The transport layer of the a first device may initially send a SYN (synchronize) packet to the transport layer of the second device, the transport layer of the second device may then respond with a SYN ACK (synchronize-acknowledgement) packet to the transport layer of the first device, and the first device may then send an ACK (acknowledgement) to the transport layer of the second device.

This three-message transport-layer handshake is relatively quick, with the limited size SYN, SYN-ACK, and ACK packets occurring in quick succession. Nevertheless, since each of these messages comes down from the transport layer of one of the devices to that device's data-link layer for transmission of the message on the shared wireless channel to the other device, the data-link layer of the transmitting device would normally go through the process of checking for and confirming availability of the channel respectively before engaging in each message transmission. Yet checking for and confirming channel availability before each message transmission in this three-message transport-layer handshake can slow down the handshake process, consume battery power (if applicable), and reduce channel capacity by extending the overall duration of use of the channel for the transport-layer handshake.

As another example, when two devices are engaged in application-layer voice communication with each other, their respective application layers may each transmit a voice frame to the other device every 20 milliseconds. (Each such voice frame may or may not carry actual speech data; when the device user is not talking, the transmitted voice frame may carry a comfort noise indicator or other information instead of speech data.) In particular, every 20 milliseconds, the application layer of a first device may send a voice frame to the application layer of second device, and the application layer of the second device may then responsively send a voice frame to the application layer of the first device. These voice frames may be limited in size, with their transmission duration typically being less a millisecond with current wireless technologies.

As with the TCP exchange noted above, this back-and-forth voice frame exchange could occur in very quick succession. But since each of these voice frames comes down from the application layer of one of the devices to that device's data-link layer for transmission on the shared wireless channel, the data-link layer of the transmitting device would then normally go through the process of checking for and confirming availability of the channel before engaging in each such voice frame transmission. However, checking for and confirming channel availability before each transmission in this voice frame exchange can slow down the voice frame exchange process, consume battery power (if applicable), and reduce channel capacity by extending the overall duration of use of the channel for the voice frame exchange.

As yet another example, when two devices work to set up a packet-based real-time media session, or for other reasons, the devices may engage in a defined application-layer exchange of Session Initiation Protocol (SIP) messages with each other. For instance, the application layer of the initiating device may send to the application layer of the other device a SIP INVITE message, the application layer of the other device may then respond to the application layer of the initiating device with a SIP 200 OK message, and the application layer of the initiating device may then reply to the application layer of the other device with a SIP ACK message.

Much like the TCP example above, these SIP message transmissions characterized by limited size packets may occur in quick succession. But as with the voice example above, since each of the SIP messages comes down from the application layer of one of the devices to that device's data-link layer for transmission on the shared wireless channel to the other device, the data-link layer of the transmitting device would then normally go through the process of checking for and confirming availability of the channel before engaging in each such transmission. Yet akin to the above examples, checking for and confirming channel availability before each transmission in this SIP message exchange can slow down the SIP message exchange process, consume battery power, and reduce channel capacity by extending the overall duration of use of the channel for the SIP message exchange.

Disclosed herein is an improvement to help address the above issue. In accordance with the disclosure, when an upper layer of a device is going to initiate an exchange of two or more messages with a corresponding layer of another device, the initiating device will provide from its upper layer to a lower layer (e.g., its data-link-layer such as its MAC layer) the initial message of the exchange, and the device will check for and confirm availability of the channel before then transmitting that initial message to the other device. But the initiating device will also provide from its upper layer to its lower layer an indication of how many messages the devices will be exchanging. In response to that indication, the lower layer of the initiating device will then cause the lower layer of the other device to forgo checking for and confirming availability of the channel for transmission of the next message of the exchange from the other device to the initiating device. Further, to the extent applicable, this process may cause the lower layer of either device to responsively forgo checking for and confirming availability of the channel for each subsequent message of the exchange as well.

Accordingly, in one respect, disclosed is a method for data communication between first and second devices via a wireless channel, where each device is configured with a protocol stack through which the device processes outbound data messages for transmission from the device over the wireless channel, the protocol stack including an upper layer configured to provide the data messages for transmission and a lower layer configured (i) to manage transmission of the provided data messages over the wireless channel and (ii) to check for and confirm availability of the wireless channel each time the device is going to transmit a data message over the wireless channel.

In the method, the first device provides from its upper layer to its lower layer an indication of a quantity, N, of data messages that the first device and second device will be exchanging with each other, where N≥2, and where, in the exchanging, the first device will transmit to the second device an initial one of the N messages, and the second device will then responsively transmit to the first device a next one of the N messages. Further, the upper layer of the first device provides the lower layer of the first device with the initial one of the N data messages for transmission of the initial message to the second device.

Responsive to the provided initial data message, the lower layer of the first device checks for and confirms availability of the wireless channel and then transmits the provided initial data message via the wireless channel to the second device. And responsive to the provided indication of the quantity, N, of data messages that the first device and second device will be exchanging with each other, the lower layer of the first device causes the lower layer of the second device to forgo checking for and confirming availability of the wireless channel when the second device is going to transmit the next one of the N data messages via the wireless channel to the first device. For instance, the lower layer of the first device may do this by including an indication of the quantity N in its transmission to the lower layer of the second device, with the lower layer of the second device being configured to respond to that indication by forgoing checking for and confirming availability of the channel for the next message it receives from its upper layer for transmission to the first device.

Further, disclosed is a method for data communication between first and second devices via a wireless channel, where each device implements a protocol stack including an upper layer and a lower layer, and where each device normally checks for and confirms availability of the wireless channel before each data message transmission that the device provides on the wireless channel.

In accordance with the method, the first device provides from the upper layer of the first device to the lower layer of the first device an indication of a quantity, N, of data messages that first device will be exchanging with the second device, where N≥2, and where, in the exchanging, the first device and second device will alternate transmitting messages of the exchange to each other. And responsive to the provided indication, the lower layer of the first device will cause the lower layer of the second device to forgo checking for and confirming availability of the wireless channel for transmission of one or more subsequent messages of the N messages, and/or will itself forgo from checking for and confirming availability of the wireless channel for transmission of one or more subsequent messages of the N messages.

And still further, disclosed is a system for data communication between first and second devices via a wireless channel, where each device includes a wireless communication interface for transmitting and receiving over the wireless channel, and where each device is configured with a protocol stack through which the device processes outbound data messages for transmission from the device over the wireless channel, the protocol stack including an upper layer configured to provide the data messages for transmission and a lower layer configured (i) to manage transmission of the provided data messages over the wireless channel and (ii) to check for and confirm availability of the wireless channel each time the device is going to transmit a data message over the wireless channel.

In the disclosed system, the first device is configured to provide from its upper layer to its lower layer an indication of a quantity, N, of data messages that the first device and second device will be exchanging with each other, where N≥2, and where, in the exchanging, the first device will transmit to the second device an initial one of the N messages, and the second device will then responsively transmit to the first device a next one of the N messages. Further, the first device is configured to provide from its upper layer to its lower layer of the initial one of the N data messages for transmission of the initial data message to the second device.

In addition, the lower layer of the first device is further configured to respond to the provided initial data message by checking for and confirming availability of the wireless channel and then transmitting the provided initial data message via the wireless channel to the second device. And the lower layer is further configured to respond to the provided indication of the quantity, N, of data messages that the first device and second device will be exchanging with each other by causing the lower layer of the second device to forgo checking for and confirming availability of the wireless channel when the second device is going to transmit the next one of the N data messages via the wireless channel to the first device.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Figure 1:
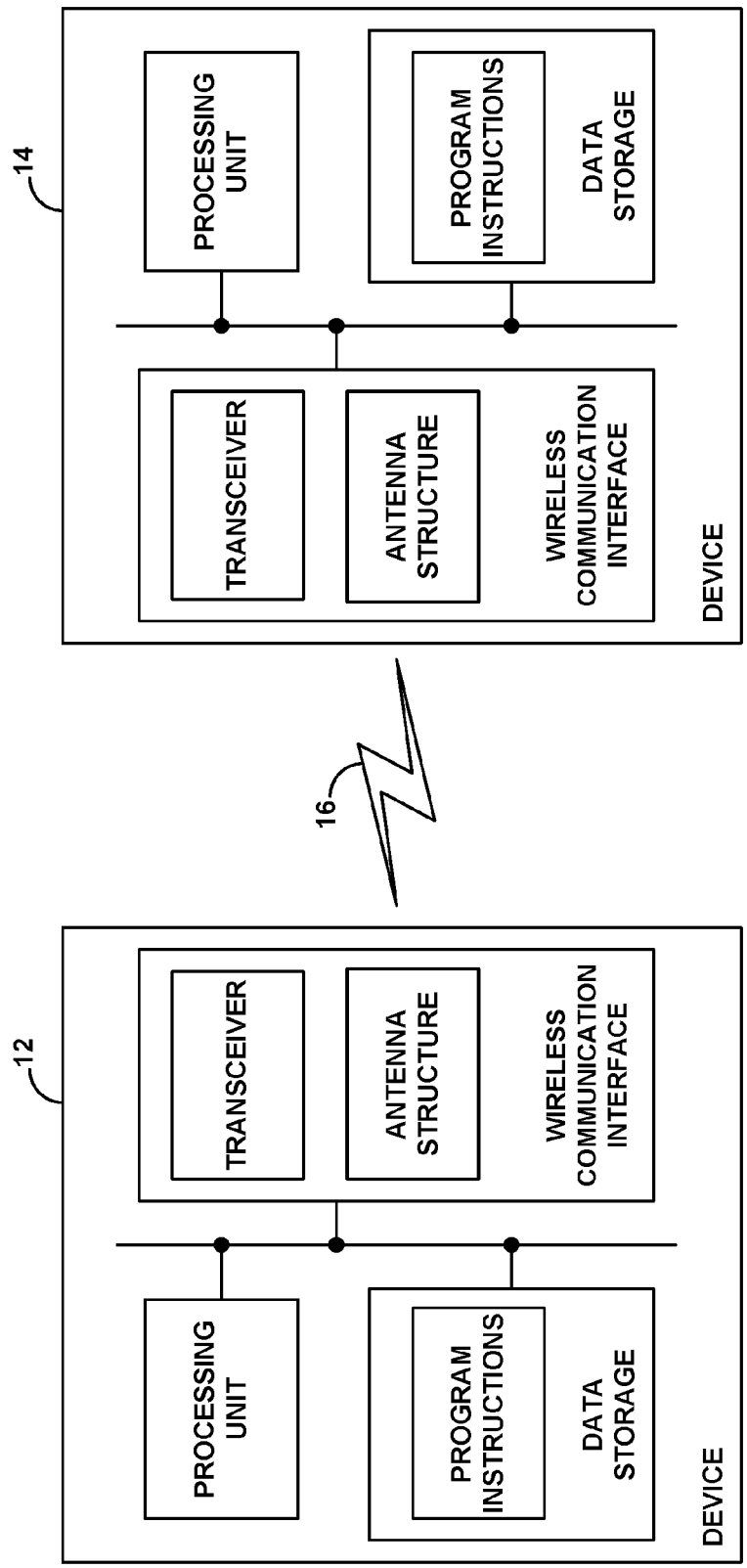
FIG. 1 is a simplified block diagram of an example system in which features of the present disclosure can be implemented.

Referring to the drawings, as noted above, FIG. 1 is a simplified block diagram of an example system in which features of the present disclosure can be implemented. As shown, the example system includes a first device 12 and a second device 14 being arranged to communicate with each other over a shared wireless channel 16. Each device in this example system could take various forms, examples of which include computers, cell phones, appliances, access points, small cells, and other wirelessly-equipped devices. As such, as shown, each device has a respective wireless communication interface, including a transceiver and antenna structure, and a processing unit and data storage, which could be integrated together on a common chipset or could be communicatively linked together by a system bus or other mechanism or provided in another arrangement.

In this example system, the wireless channel 16 may be one defined by industry regulation for licensed or unlicensed use by devices such as devices 12 and 14. As such, the channel may have a defined frequency bandwidth spanning a particular range in the radio-frequency (RF) spectrum, such as 20 MHz for instance. This channel may be a shared wireless channel, in that the channel is available for any device at any time, rather than being pre-assigned for use by specific devices. With such an arrangement, devices that communicate on the channel may therefore be configured by default to check for and confirm availability of the channel before transmitting on the channel, to help ensure that no other devices are currently using the channel and perhaps to help ensure the availability of the channel for a duration of the planned transmission.

The wireless communication interfaces of both devices 12 and 14 may then be arranged to communicate with each other on channel 16 (and perhaps concurrently on one or more other such channels as well) according to an agreed air interface protocol. By way of example and without limitation, the protocol could be WiFi, as defined by the IEEE 802.11 series of standards.

Each device's processing unit may then comprise one or more microprocessors, application specific integrated circuits, or the like, configured to carry out various device operations described herein. As shown, for example, the data storage of each device, which could include one or more volatile and/or non-volatile storage units (such as magnetic, optical, or flash memory), could hold program instructions, which could be executable by the processing unit of the device to carry out various disclosed operations.

In practice as noted above, each device may implement a protocol stack to facilitate communication with the other device. In particular, as noted, the protocol stack may define a sequence of logical processing layers through which the device processes incoming and outgoing communications. Each device's protocol stack could be implemented by hardware, firmware, and/or software, such as by the device's programmed processor in conjunction with the device's wireless communication interface and/or other components. Such a protocol stack could be compliant with the well-known Open Systems Interconnection (OSI) model, in which each layer serves the layer above it and is served by the layer below it.

The OSI model defines seven layers ranging from top down, as an application layer, a presentation layer, a session layer, a transport layer, a network layer, a data link layer, and a physical layer. Among other functions, the application layer provides high level application program interfaces, the presentation layer provides for translation of data between application and network-service formats, the session layer provides for managing communication sessions between devices, the transport layer provides for reliable transmission of data segments between devices (including segmentation and acknowledgement services), the network layer provides for structuring and managing a multi-node network (including addressing and routing), the data link layer provides for reliable transmission of data frames between devices via the physical layer, and the physical layer provides for transmission and reception of raw bit streams over a physical medium.

At each layer of such a protocol stack, the devices may communicate protocol data units (PDUs) with each other.

The PDU communicated at each layer may contain payload referred to as a service data unit (SDU) along with layer-specific headers or the like. When an upper layer of such a device seeks to transmit data to the corresponding upper layer of the other device, the upper layer of the transmitting device may generate a PDU and call the next lower layer of the device's stack, passing the PDU along for handling. The called layer may thus receive the PDU as an SDU, take its own layer-specific action (e.g., adding layer-specific header information) to generate its own PDU, and call the next layer down, passing the PDU along for handling. Ultimately through this cross-layer communication, the data-link layer may manage transmission of the data on the physical layer, such as shared wireless channel 16, to the other device. And at the other device, the received transmission would be processed up the stack to the destination layer for processing.

Figure 2:
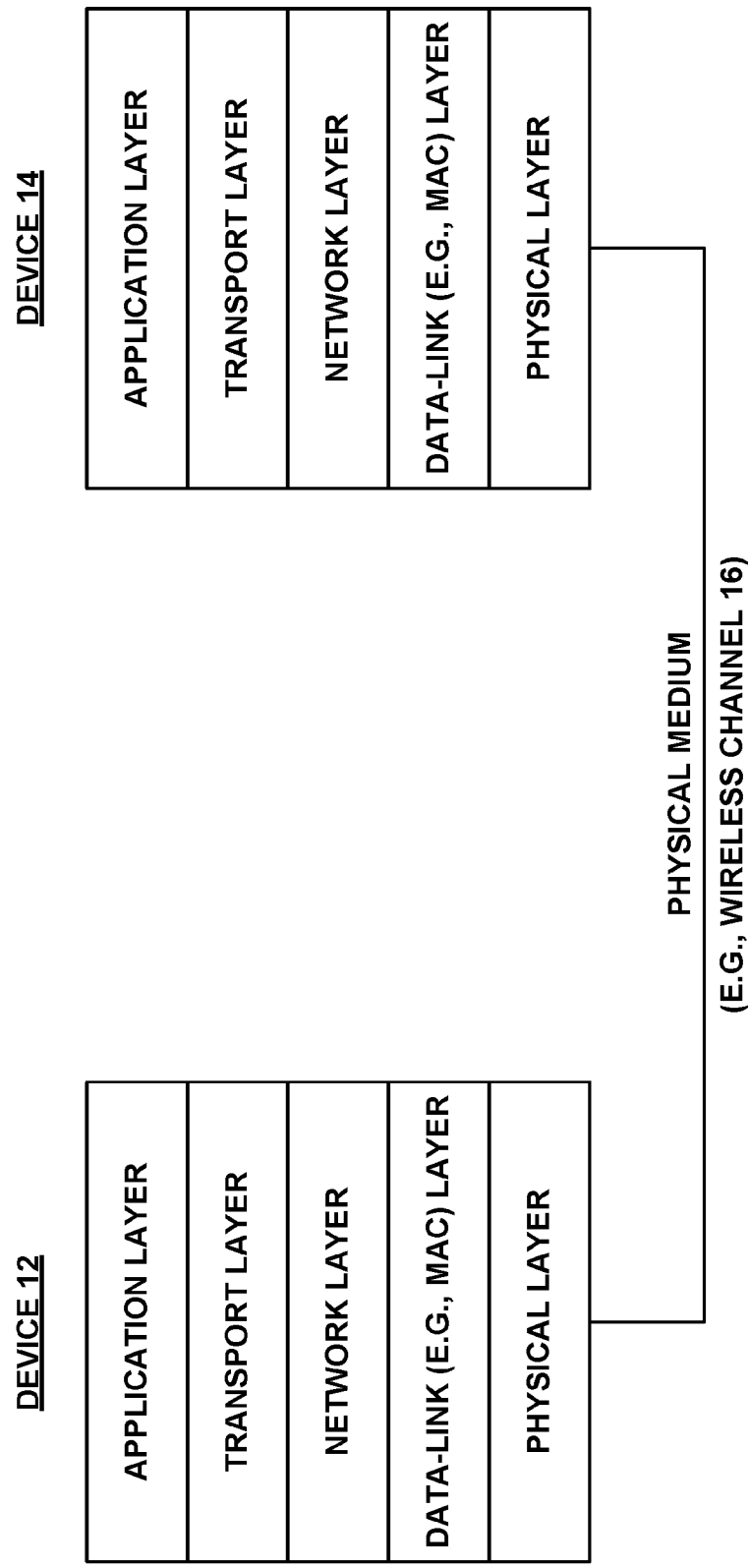
FIG. 2 is a depiction of example protocol stacks implemented in the devices of FIG. 1.

FIG. 2 illustrates a simplified version of such a protocol stack at each device 12, 14 for discussion purposes. As shown in FIG. 2, the example stack includes, from top down, an application layer, a transport layer, a network layer, a data-link layer, and a physical layer. In this simplified example, the application layer could include the above-discussed application-layer, presentation-layer, and session-layer features. Further, the data-link layer could be a MAC layer, and the physical layer could operate to communicate over a shared wireless channel as noted above. In this example, as shown, the data-link layer (or data-link layer and physical layer) is an example of a lower layer of the protocol stack, and the application, transport, and network layers are examples of upper layers of the protocol stack. Other examples are possible as well.

The data-link layer in such an arrangement could be a MAC layer, which could operate to manage transmission on the physical channel. In practice, each device may have a respective MAC address that uniquely identifies the device as compared with other devices, and the PDUs communicated between the devices' MAC layers may include MAC headers that carry source and destination MAC addresses, with the source MAC address being the MAC address of the device from which the communication is being sent and the destination MAC address being the MAC address of the device to which the communication is being sent.

With this arrangement, as noted above, the devices may each be configured at their data-link layers to check for and confirm availability of the wireless channel each time the data-link layer receives an SDU for processing/output. In particular, per logic at the data-link layer, the device may engage in a CSMA/CA process as noted above, causing the wireless communication interface to monitor energy on the channel (i.e., sense the channel) for a defined time interval so as to check for and confirm the absence of other device transmission (e.g., other ongoing transmission) on the channel. Further, the data-link layer of the device may engage in the RTS/CTS signaling process with the data-link layer of the other device as noted above, to help further confirm that the channel will be available for the intended transmission.

Figure 3:
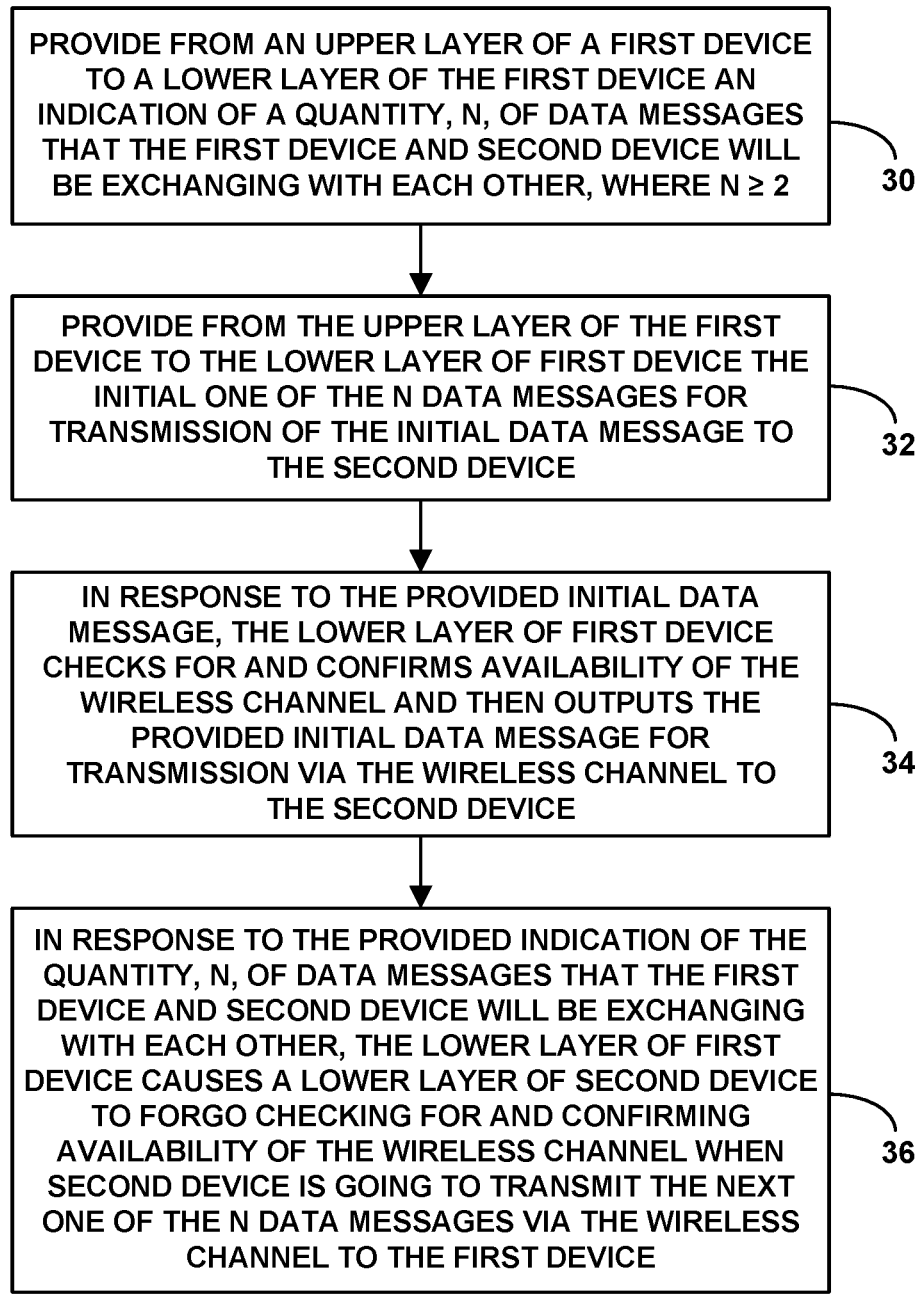
FIG. 3 is a flow chart depicting operations in accordance with an example method.

FIG. 3 is next a flow chart depicting a method that can be implemented in accordance with the present disclosure, in an arrangement such as this. As shown in FIG. 3, at block 30, the method involves providing from an upper layer of the first device to a lower layer of the first device an indication of a quantity, N, of data messages that the first device and second device will be exchanging with each other, where $N \geq 2$, and where, in the exchanging, the first device will transmit to the second device an initial one of the N messages, and the second device will then responsively transmit to the first device a next one of the N messages. And at block 32, the method involves providing from the upper layer of the first device to the lower layer of the first device the initial one of the N data messages for transmission of the initial data message to the second device.

In this process, the provided indication of the quantity N could be an express specification of the number N, such an integer value N, such that the lower layer could read the value N and thereby gain knowledge of the number of messages to be exchanged. Alternatively, the indication of the quantity N could be another value that correlates with the number N. For instance, the indication could be a specification of communication type (data message exchange type), where particular communication types are known to involve a particular number, N, of messages being exchanged. And the lower layer could be configured to read such an indication and to map the indication to the number N, such as by referring to stored logic that correlates communication-type specifications with numbers, N, of messages that will be exchanged. By way of example, the communication-type could be TCP-handshake or SIP-handshake, either of which could map to N=3, or voice-frame exchange, which could map to N=2. Other examples are possible as well.

The upper layer could provide this indication of the quantity N to the lower layer through cross-layer communication separate from or together with the upper layer providing the initial data message. For instance, the upper layer could pass the indication as a header parameter in the PDU that carries the initial data message to the next layer down. Ultimately when the lower layer receives the associated SDU, the lower layer could then perform deep packet inspection to read the payload of the upper layer's PDU to determine the indication of the quantity N. Alternatively, the indication could be provided along with the initial data message in some other manner. And still alternatively, the upper layer could provide the indication to the lower layer in some other manner, such as by directly signaling to the lower layer or by engaging in cross-layer communication specifically for purposes of providing the indication.

In practice, the upper layer could be configured to do this for only certain types of message exchanges, perhaps conditional on the message exchange being a type that would occur in quick succession, like those noted above for instance, or perhaps conditional on the message exchange being of a threshold high service level such as particularly delay-sensitive and could thus especially benefit from the presently disclosed process. Other triggers could be possible as well.

At block 34, in response to the provided initial data message, the lower layer of the first device checks for and confirms availability of the wireless channel and then outputs the provided initial data message for transmission via the wireless channel to the second device. As noted above, this could involve the lower layer applying a CSMA/CA process and perhaps further engaging in RTS/CTS signaling with the lower layer of the other device.

Further, at block 36, in response to the provided indication of the quantity, N, of data messages that the first device and second device will be exchanging with each other (and perhaps in response to the number N being at least 2), the lower layer of the first device causes the lower layer of the second device to forgo checking for and confirming availability of the wireless channel when the second device is going to transmit the next one of the N data messages via the wireless channel to the first device. In particular, the lower layer of the first device takes action to cause the lower layer of the second device to forgo the default process of checking for and confirming availability of the channel for transmission of the next message of the exchange to the first device.

The lower layer of the first device could cause the lower layer of the second device to forgo checking for and confirming availability of the channel for transmission of the next message in various ways.

By way of example, the lower layer of the first device could indicate quantity N along with the transmission of the initial data message from the first device to the second device, so as to inform the lower layer of the second device that at least the next message from the second device to the first device is part of the message exchange and thus that the second device should not check for and confirm availability of the wireless channel for transmission of that next message.

For instance, the lower layer of the first device could add to a PDU header of the initial message transmission to the second device an indication of the quantity, N, of messages that the devices will be exchanging with each other, and the lower layer of the second device could read that header indication and responsively set itself to forgo checking for and confirming availability of the channel for transmission of the next message of the exchange. In an 802.11 implementation, for example, the indication of the quantity of N could be specified in the TYPE and SUBTYPE portions of a FRAME CONTROL field of an 802.11 header, or in any other existing or added field of the 802.11 frame format. The indication so added could be the same type of indication provided by the upper layer of the first device or could take another form. Further, if the quantity is indicated, it could be N−1 rather than, as an indication of the remaining number of messages (after the initial message) in the exchange.

Alternatively, if the lower layer of the first device will engage in RTS/CTS signaling with the lower layer of the second device, the lower layer of the first device could provide the indication of the quantity, N, in a header of its RTS signal to the lower layer of the second device, and the lower layer of the second device could read the indication from the RTS header and responsively set itself to forgo checking for and confirming availability of the channel for the next message of the exchange. This approach could have an added benefit of alerting neighboring devices of the quantity N as well, which may enable them to avoid using the channel for a duration suitable for the entire N-message exchange. (Likewise, the lower layer of the second device could also include such an indication in its CTS signal to the lower layer of the first device, which could have similar benefit with respect to neighboring devices.) Still alternatively, the lower layer of the first device could provide the indication to the lower layer of the second device in other ways as well.

When the lower layer of the second device receives the indication of the quantity, N, from the lower layer of the first device, the lower layer of the second device could configure itself to not engage in the CSMA/CA (and perhaps RTS/CTS) process that it would normally engage in for a next SDU that it receives for transmission to the first device. Thus, once the received initial data message passes up the stack of the second device to the upper layer of the second device and the upper layer of the second device generates and provides down the stack of the second device a next message of the exchange for transmission to the first device, the lower layer of the second device could detect that that next message is destined to the same first device and could, accordingly, immediately output the message for transmission to the first device, without engaging in the default process of checking for and confirming availability of the channel before doing so.

In this process, if the quantity, N, of messages that the devices will be exchanging is at least three, then, after the second device responsively transmits to the first device the next one (i.e., the $2^{nd}$ one) of the N data messages, the first device would in turn transmit a subsequent one (i.e., the $3^{rd}$) of the N data messages to the second device. In that case, the lower layer of the first device may also configure itself to not engage in the CSMA/CA (and perhaps RTS/CTS) process that it would normally engage in for a next SDU (after the initial message) that it receives for transmission to the second device. Thus, once the upper layer of the first device generates and provides down the stack of the first device the $3^{rd}$ message of the exchange for transmission to the second device, the lower layer of the first device could detect that that message is destined to the same second device and could, accordingly, immediately output the message for transmission to the second device, without engaging in the default process of checking for and confirming availability of the channel before doing so.

In line with the discussion above, this method could apply when the upper layer of the first device is going to engage in an exchange of N messages with a corresponding upper layer of the second device, where N≥2. By way of example, the method could apply for a transport layer exchange such as a TCP handshake for establishing a TCP connection (e.g., TCP socket) between the devices, in which case the initial message could be a TCP SYN message, the next message could be a TCP SYN-ACK message, and the subsequent message could be a TCP ACK message. As another example, the method could apply for an application layer exchange such as a voice frame exchange, in which case the initial message could be a voice frame from the first device to the second device, and the next message could be a voice frame from the second device to the first device. And as still another example, the method could apply for an application layer exchange such as a SIP handshake, in which case the first message could be a SIP INVITE message, the next message could be a SIP 200 OK message, and the subsequent message could be a SIP ACK message. Other examples are possible as well.

Figure 4:
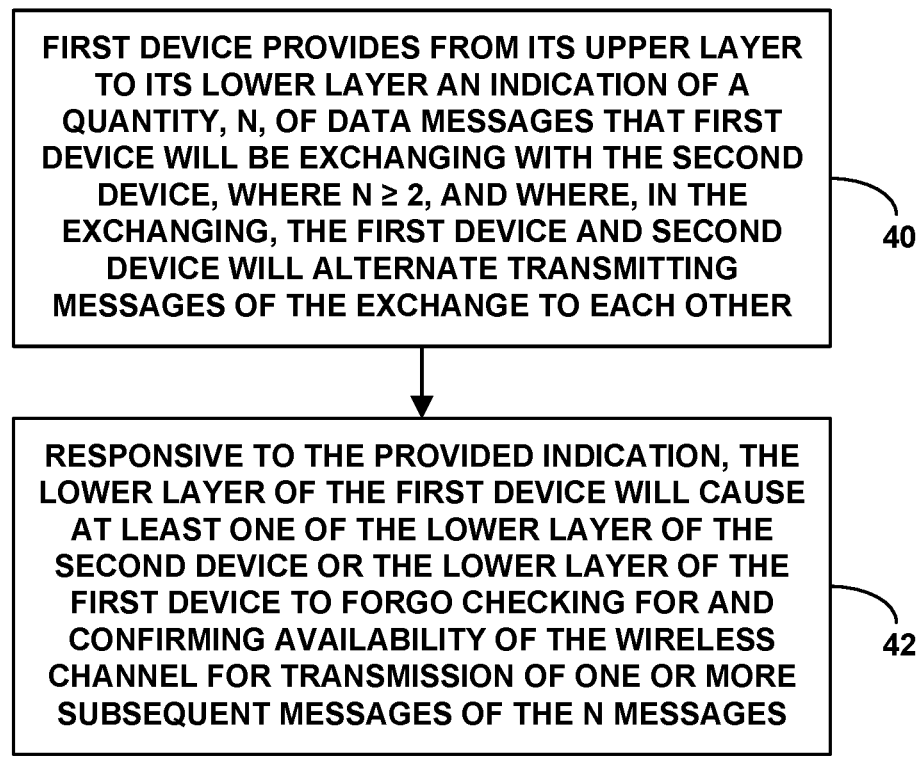
FIG. 4 is another flow chart depicting operations in accordance with an example method.

FIG. 4 is next another flow chart depicting a method that can be implemented in accordance with the present disclosure, for data communication between a first device and a second device via a wireless channel. In line with the discussion above, each device implements a protocol stack including an upper layer and a lower layer, and each device normally checks for and confirms availability of the wireless channel before each data message transmission that the device provides on the wireless channel.

As shown in the figure, at block 40, the method includes the first device providing from its upper layer to its lower layer an indication of a quantity, N, of data messages that first device will be exchanging with the second device, where N≥2, and where, in the exchanging, the first device and second device will alternate transmitting messages of the exchange to each other (i.e., they will engage in a back-and-forth message exchange). And at block 42, responsive to the provided indication, the lower layer of the first device will cause at least one of the lower layer of the second device or the lower layer of the first device to forgo checking for and confirming availability of the wireless channel for transmission of one or more subsequent messages of the N messages.

In an example of this method, as discussed above, the quantity N could be 2, in which case, in the exchanging, the first device would transmit an initial ($1^{st}$) one of the N messages to the second device, and the second device would then responsively transmit a next ($2^{nd}$) one of the N messages to the first device. In that case, in line with the discussion above, the act of causing at least one of the lower layer of the second device or the lower layer of the first device to forgo checking for and confirming availability of the wireless channel for transmission of one or more subsequent messages of the N messages could include causing the lower layer of the second device to forgo checking for and confirming availability of the wireless channel for transmission of the $2^{nd}$ one of the N messages, in any of the ways discussed above for instance.

Further, in another example, the quantity N could be at least 3, in which case, in the exchanging, the first device would transmits an initial ($1^{st}$) one of the N messages to the second device, the second device would then responsively transmit a next ($2^{nd}$) one of the N messages to the first device, and the first device would then then responsively transmit a next ($3^{rd}$) one of the N messages to the second device. In that case, as discussed above, the act of causing at least one of the lower layer of the second device or the lower layer of the first device to forgo checking for and confirming availability of the wireless channel for transmission of one or more subsequent messages of the N messages could include causing the lower layer of the first device (i.e., setting or configuring the lower layer of the first device) to forgo checking for and confirming availability of the wireless channel for transmission of the $3^{rd}$ one of the N messages.

In the representative system, the lower layer of the first device may thus be configured to carry out features such as those described above. For instance, the lower layer could be configured to respond to the provided initial data message by checking for and confirming availability of the wireless channel and then transmitting the provided initial data message via the wireless channel to the second device. Further, the lower layer could be configured to respond to the provided indication of the quantity, N, of data messages that the first device and second device will be exchanging with each other by causing the lower layer of the second device to forgo checking for and confirming availability of the wireless channel when the second device is going to transmit the next one of the N data messages via the wireless channel to the first device—such as by indicating the quantity N to the lower layer of the second device. And still further, the lower layer could be configured to respond to the provided indication by forgoing checking for and confirming availability of the wireless channel for transmission of a subsequent message of the N messages from the first device to the second device.

Further, as an enhancement of the methods described above, the lower layer of either device could also be configured to determine how long has passed since transmission of a last message of the exchange to or from the device, and if longer than a defined threshold amount of time has passed, to abort the above described process. The point here is that, as noted above, the presently disclosed process can be especially useful where the message transmissions of the N-way message exchange occur in quick succession, since the confirmation of channel availability at the start of that exchange (e.g., before the initial message transmission) could then suffice for the duration of the message exchange. Whereas, if there is long enough delay between message transmissions, then other devices may more likely be contending for use of the channel when the later message transmissions occur, and so it may be better to check for and confirm channel availability at that point. What time period constitutes a long enough delay for this purpose is a matter of design choice; checking for that time period passing, and responsively aborting the process is the enhancement.

Exemplary embodiments have been described above. Those skilled in the art will understand, however, that changes and modifications may be made to these embodiments without departing from the true scope and spirit of the invention.

We claim:

1. A method for data communication between first and second devices via a wireless channel, wherein each device is configured with a protocol stack through which the device processes outbound data messages for transmission from the device over the wireless channel, the protocol stack including an upper layer configured to provide the data messages for transmission and a lower layer configured (i) to manage transmission of the provided data messages over the wireless channel and (ii) to check for and confirm availability of the wireless channel each time the device is going to transmit a data message over the wireless channel, the method comprising:

providing from the upper layer of the first device to the lower layer of the first device an indication of a quantity, N, of data messages that the first device and second device will be exchanging with each other, wherein N≥2, and wherein, in the exchanging, the first device will transmit to the second device an initial one of the N data messages, and the second device will then responsively transmit to the first device a next one of the N data messages;

providing from the upper layer of the first device to the lower layer of the first device the initial one of the N data messages for transmission of the initial data message to the second device;

responsive to the provided initial data message, the lower layer of the first device checking for and confirming availability of the wireless channel and then outputting the provided initial data message for transmission via the wireless channel to the second device; and responsive to the provided indication of the quantity, N, of data messages that the first device and second device will be exchanging with each other, the lower layer of the first device causing the lower layer of the second device to forgo checking for and confirming availability of the wireless channel when the second device is going to transmit the next one of the N data messages via the wireless channel to the first device.

2. The method of claim 1, whereby, in the exchanging, after the second device responsively transmits to the first device the next one of the N data messages, the first device then responsively transmits a subsequent one of the N data messages to the second device, the method further comprising:

responsive to the provided indication of the quantity, N, of data messages that the first device and second device will be exchanging with each other, the lower layer of the first device forgoing checking for and confirming availability of the wireless channel when the first device is going to transmit the subsequent one of the N data messages via the wireless channel to the second device.

3. The method of claim 1, wherein the indication of the quantity, N, of data messages that the first device and second device will be exchanging with each other comprises a specification of N.

4. The method of claim 1, wherein the indication of the quantity, N, of data messages that the first device and second device will be exchanging with each other comprises a specification of a type of data message exchange that the first device and second will engage with each other, wherein the type maps to the quantity N.

5. The method of claim 1, wherein the lower layer of the first device causing the lower layer of the second device to forgo checking for and confirming availability of the wireless channel when the second device is going to transmit the next one of the N data messages via the wireless channel to the first device comprises the lower layer of the first device indicating the quantity N along with the transmission of the initial data message from the first device to the second device, whereby indicating the quantity N informs the lower layer of the second device that at least the next data message from the second device to the first device is part of the exchanging and thus that the second device should not check for and confirm availability of the wireless channel for transmission of the next data message.

6. The method of claim 1, wherein the exchanging of N data messages between the first device and second device comprise an exchange of the N data messages between the upper layer of the first device and the upper layer of the second device.

7. The method of claim 6, wherein the upper layer of each device is a transport layer, and the lower layer of each device is a link layer, and wherein the exchanging comprises a Transmission Control Protocol (TCP) handshake for establishing a TCP connection between the first device and the second device, wherein the TCP handshake comprises (i) the transport layer of the first device sending a SYN message to the transport layer of the second device, (ii) the transport layer of the second device replying with a SYN-ACK message to the transport layer of the first device, and (iii) the transport layer of the first device then replying with an ACK message to the transport layer of the second device.

8. The method of claim 6, wherein the upper layer of each device is an application layer, and wherein the lower layer of each device is a link layer.

9. The method of claim 8, wherein the exchanging comprises an exchange of voice frames, wherein the exchange of voice frames comprises (i) the application layer of the first device sending a voice frame to the application layer of the second device, and (ii) the application layer of the second device responsively sending a voice frame to the application layer of the first device.

10. The method of claim 8, wherein the exchanging comprises a Session Initiation Protocol (SIP) handshake for establishing a session, wherein the SIP handshake comprises (i) the application layer of the first device sending a SIP INVITE message to the application layer of the second device, (ii) the application layer of the second device then replying with a SIP 200 OK message to the application layer of the first device, and (iii) the application layer of the first device then replying with a SIP ACK message to the application layer of the second device.

11. The method of claim 1, wherein checking for and confirming availability of the wireless channel comprises:
sensing the wireless channel for a predefined time period to detect whether ongoing transmission exists on the wireless channel; and
confirming that the channel is currently available only if the sensing establishes that ongoing transmission does not exist on the channel.

12. The method of claim 11, wherein checking for and confirming availability of the wireless channel further comprises:
after detecting that transmission does not exist on the channel, (i) transmitting a Ready-To-Send (RTS) control message indicating a plan to transmit a data message, and (ii) receiving a Clear-to-Send (CTS) control message in response to the transmitted RTS message.

13. The method of claim 12, wherein the lower layer of the first device causing the lower layer of the second device to forgo checking for and confirming availability of the wireless channel when the second device is going to transmit the next one of the N data messages via the wireless channel to the first device comprises the lower layer of the first device indicating the quantity N in the RTS control message that the lower layer of the first device sends before transmitting the initial data message of the N data messages,
whereby indicating the quantity N informs the lower layer of the second device that at least the next data message from the second device to the first device is part of the exchanging and thus that the second device should not check for and confirm availability of the wireless channel for transmission of the next data message.

14. The method of claim 1, carried out in response to a determination that the exchanging is associated with a threshold high service level.

15. A method for data communication between first and second devices via a wireless channel, wherein each device implements a protocol stack including an upper layer and a lower layer, and wherein each device normally checks for and confirms availability of the wireless channel before each data message transmission that the device provides on the wireless channel, a method comprising:
providing by the first device from the upper layer of the first device to the lower layer of the first device an indication of a quantity, N, of data messages that first device will be exchanging with the second device, wherein N≥2, and wherein, in the exchanging, the first device and second device will alternate transmitting data messages of the exchange to each other; and
responsive to the provided indication, the lower layer of the first device causing at least one of the lower layer of the second device or the lower layer of the first device to forgo checking for and confirming availability of the wireless channel for transmission of one or more subsequent data messages of the N data messages.

16. The method of claim 15, wherein N is at least 2, whereby, in the exchanging, the first device transmits an initial ($1^{st}$) one of the N data messages to the second device and the second device then responsively transmits a next ($2^{nd}$) one of the N data messages to the first device, and
wherein causing at least one of the lower layer of the second device or the lower layer of the first device to forgo checking for and confirming availability of the wireless channel for transmission of one or more subsequent data messages of the N data messages comprises causing the lower layer of the second device to forgo checking for and confirming availability of the wireless channel for transmission of the $2^{nd}$ one of the N data messages.

17. The method of claim 15, wherein N is at least 3, whereby, in the exchanging, the first device transmits an initial ($1^{st}$) one of the N data messages to the second device, the second device then responsively transmits a next ($2^{nd}$) one of the N data messages to the first device, and the first device then responsively transmits a next ($3^{rd}$) one of the N data messages to the second device, and
wherein causing at least one of the lower layer of the second device or the lower layer of the first device to forgo checking for and confirming availability of the wireless channel for transmission of one or more subsequent data messages of the N data messages comprises causing the lower layer of the first device to forgo checking for and confirming availability of the wireless channel for transmission of the $3^{rd}$ one of the N data messages.

18. A system for data communication between first and second devices via a wireless channel, wherein each device includes a wireless communication interface for transmitting and receiving over the wireless channel,
wherein each device is configured with a protocol stack through which the device processes outbound data messages for transmission from the device over the wireless channel, the protocol stack including an upper layer configured to provide the data messages for transmission and a lower layer configured (i) to manage transmission of the provided data messages over the wireless channel and (ii) to check for and confirm availability of the wireless channel each time the device is going to transmit a data message over the wireless channel,
wherein the first device is configured to provide from its upper layer to its lower layer an indication of a quantity, N, of data messages that the first device and second device will be exchanging with each other, wherein N≥2, and wherein, in the exchanging, the first device will transmit to the second device an initial one of the N data messages, and the second device will then responsively transmit to the first device a next one of the N data messages,
wherein the first device is configured to provide from its upper layer to its lower layer of the initial one of the N data messages for transmission of the initial data message to the second device,
wherein the lower layer of the first device is configured to respond to the provided initial data message by checking for and confirming availability of the wireless channel and then transmitting the provided initial data message via the wireless channel to the second device, and
wherein the lower layer of the first device is configured to respond to the provided indication of the quantity, N, of data messages that the first device and second device will be exchanging with each other by causing the lower layer of the second device to forgo checking for and confirming availability of the wireless channel when the second device is going to transmit the next one of the N data messages via the wireless channel to the first device.

19. The system of claim 18, whereby, in the exchanging, after the second device responsively transmits to the first device the next one of the N data messages, the first device then responsively transmits a subsequent one of the N data messages to the second device, wherein the lower layer of the first device is further configured to respond to the provided indication by forgoing checking for and confirming availability of the wireless channel before transmitting the subsequent data message of the N data messages.

20. The system of claim 18, wherein causing the lower layer of the second device to forgo checking for and confirming availability of the wireless channel before transmitting the next data message of the N data messages comprises:

indicating the quantity N to the lower layer of the second device.

* * * * *